United States Patent [19]

Kozyra et al.

[11] Patent Number: 4,741,194
[45] Date of Patent: May 3, 1988

[54] COMPOSITE ROTOR MANUFACTURING METHOD

[75] Inventors: William L. Kozyra, Rochester Hills; Frank J. Vancsik, Grosse Pointe Woods, both of Mich.

[73] Assignee: The Budd Company, Troy, Mich.

[21] Appl. No.: 911,498

[22] Filed: Sep. 25, 1986

[51] Int. Cl.[4] .................. B21D 28/32; B21D 53/34; B21D 53/88
[52] U.S. Cl. .......................... 72/334; 72/379; 29/159.01; 188/218 XL
[58] Field of Search ............. 72/334, 335, 327, 379; 29/159 R, 159.01; 188/218 XL, 73.2

[56] References Cited

U.S. PATENT DOCUMENTS

| | | | |
|---|---|---|---|
| 1,651,111 | 11/1927 | Winter | 29/159 |
| 1,849,669 | 3/1932 | Glasner et al. | 72/334 |
| 3,566,503 | 3/1971 | Pacak | 29/159 R |
| 4,166,521 | 9/1979 | Okunishi et al. | 188/218 X |

FOREIGN PATENT DOCUMENTS

| | | | |
|---|---|---|---|
| 1177067 | 4/1959 | France | 188/218 X |
| 15549 | 7/1969 | Japan | 72/334 |

Primary Examiner—Daniel C. Crane
Attorney, Agent, or Firm—Harnes, Dickey & Pierce

[57] ABSTRACT

An improved apparatus and method for fabricating a composite disc brake rotor. In accordance with this invention, a composite rotor having a stamped center section and a cast or forged braking face portion is mounted onto a press which produces a central axially deflected "bubble" of metal. The formation of such a bubble causes radially inward straining of the material defining the rotor center section which has been found to substantially reduce surface waviness and imperfections in the surface. Such improvements in flatness of the rotor center section provide accurate positioning of the rotor braking when mounted on the vehicle for improved brake performance and life. Following the step of producing the center bubble, a subsequent operation is used to blank out a center mounting hole and clearance holes for wheel mounting studs.

6 Claims, 2 Drawing Sheets

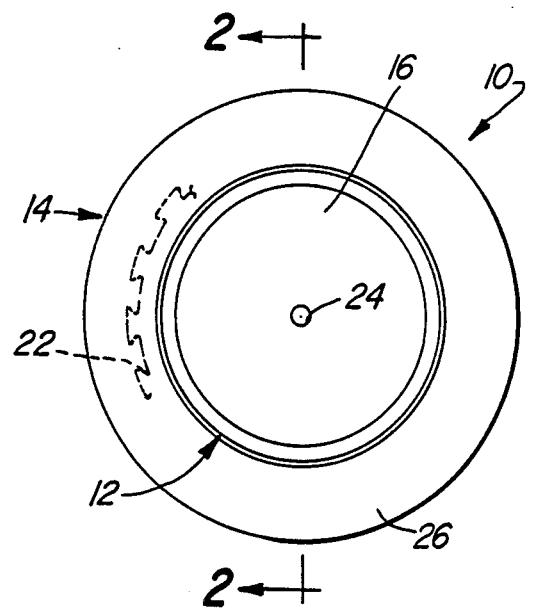
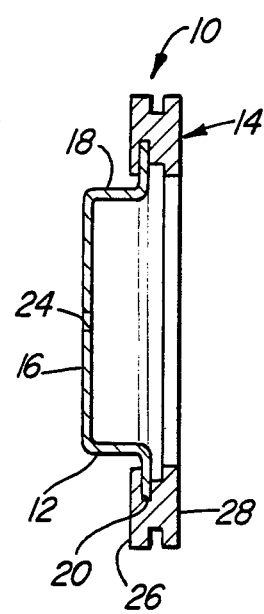
*Fig-1*  *Fig-2*
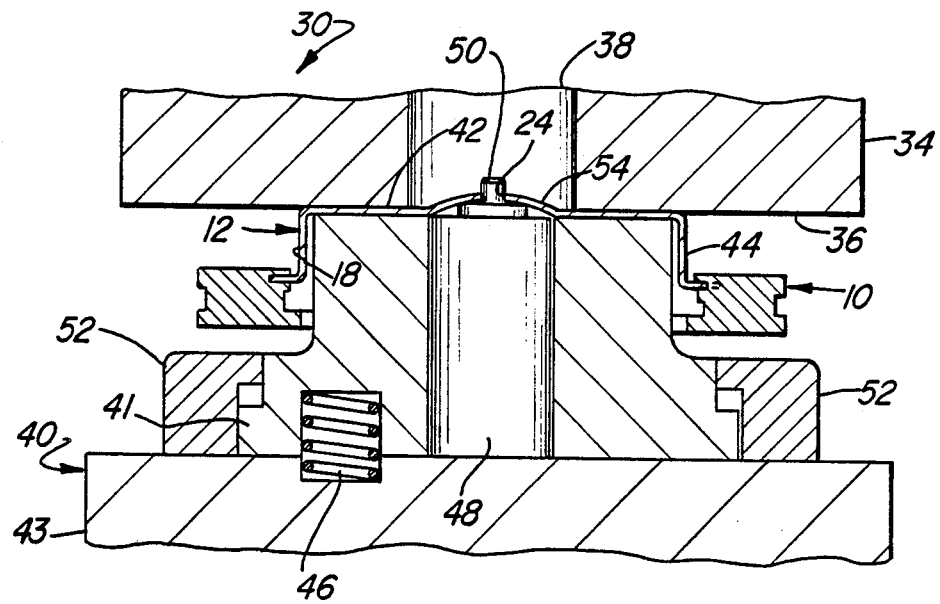
*Fig-3*

COMPOSITE ROTOR MANUFACTURING METHOD

BACKGROUND AND SUMMARY OF THE INVENTION

This invention relates to a metal working process, and particularly, to one adapted for the fabrication of a composite type disc brake rotor.

Many modern motor vehicles feature disc type brakes which employ a rotating rotor having a pair of separated parallel disc faces. Brake pads are actuated to compressively engage the rotor faces to create friction, thus providing a braking effect. While disc brakes in general are old, designers are continually striving to achieve improvements in their performance and efficiency. Moreover, there is a continuing desire to reduce the weight of all motor vehicle components. Such weight reduction goals are particularly important for components which constitute so-called "unsprung" weight that is defined as weight which is not mechanically isolated from road surface inputs by the vehicle suspension springs such as the tire, wheel, spindle, steering knuckle, axle, etc. Reductions in unsprung weight not only reduce total vehicle weight, but further improve vehicle ride and handling.

One approach toward reducing the weight of a disc brake rotor is to provide a so-called composite structure. Present designs for such rotors include a center "hat" section formed from stamped sheet metal which is loaded into a forging or casting machine. The cast or forged metal interlocks with the center section to form the separated disc faces of the rotor. The temperature of the metal surrounding the center section causes it to soften portions of the center section so that the two portions become mechanically fused. Further, mechanical features are provided for interlocking engagement between the components. Although composite disc brake structures according to the prior art have been found to be operable, several shortcomings of such designs have been observed. During the process of casting or forging the brake face portions onto the stamped metal center section, the intense heat of the process causes warping and irregularities to develop in the mounting surface of the stamped center section. Such irregularities may cause the brake surfaces to become misaligned from the rotor's axis of rotation when the rotor is mounted to the vehicle, thereby causing axial runout and out of roundness conditions. Accordingly, there is a present need to provide means for flattening and providing dimensional stability for the mounting surface of a composite brake rotor.

This invention provides means for achieving high dimensional control over the center section. Such control is provided through a process of "bubbling" a portion of the brake rotor center section such that the metal of the center section is strained in a radially inward direction to "stretch out" any irregularities. Thereafter, the deflected center "bubble" portion is removed through a blanking operation which provides a center clearance hole necessary for the associated vehicle's axle hub.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a frontal view of a composite rotor structure;

FIG. 2 is a cross-sectional view taken along lines 2—2 of FIG. 1;

FIG. 3 illustrates the composite rotor shown in FIG. 1 being processed in a machine in accordance with this invention which provides a center "bubble" to thereby flatten the center section of the rotor;

DETAILED DESCRIPTION OF THE INVENTION

Figure 4:
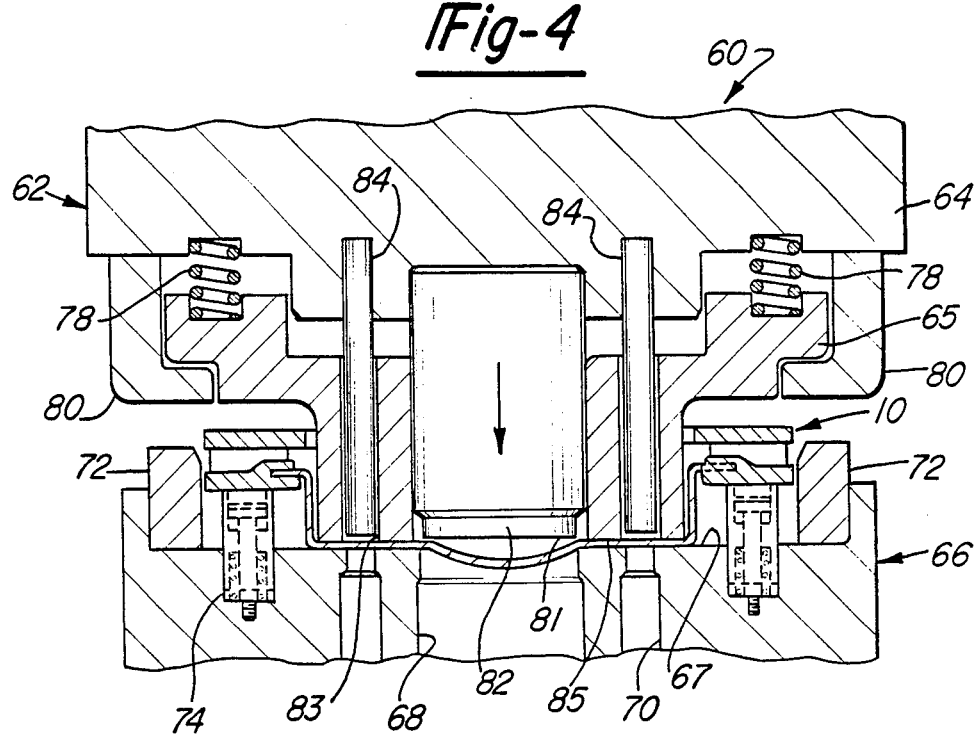
FIG. 4 shows the rotor of FIG. 1 following the processing step of FIG. 3 wherein the center hub clearance hole and mounting stud clearance holes are blanked from the rotor.

FIGS. 1 and 2 illustrate a composite rotor structure which is generally designated by reference number 10. Composite rotor 10 includes a center section 12 made from stamped sheet metal and having braking face portion 14 which is cast or forged around the center section. Center section 12 has a mounting surface 16, a cylindrical wall 18, and radially projecting flange 20. As best shown in FIG. 1, flange 20 preferably is formed to have a plurality of notches 22 (shown in phantom lines) which enables the metal forming braking face portion 14 to interlockingly engage with center section 12. Center section 12 further defines center hole 24 which is provided for locating, handling, and machining purposes.

As previously mentioned, the process of casting or forging braking face portion 14 onto center section 12 causes warpage and surface irregularities to be generated within the center section primarily due to intense heat exposure. In use, rotor 10 is installed onto a vehicle axle mounting flange and rotates with the wheel. Irregularities and misalignment of center section 12 can cause the face surfaces 26 and 28 to have radial or axial runout which can lead to poor braking performance and excessive brake pad wear. The processing steps in accordance with this invention described hereinafter provide means for substantially flattening mounting surface 16 of center section 12.

FIG. 3 illustrates a machine particularly adapted for carrying out the "bubbling" process in accordance with this invention. Machine 30 is a press device which may be hydraulically actuated having upper and lower platens (not shown) which are controllably moved toward one another in response to hydraulic pressure or another energy source. Upper die assembly 34 includes a generally flat face surface 36 with a central bore 38. Lower die assembly 40 includes die portions 41 and 43. Die portion 41 defines face surface 42 and cylindrical side surface 44 which is adapted to closely conform with the internal surface of rotor wall 18. Die portion 41 is axially movable with respect to lower die portion 43 through deflection of spring 46. Post 48 is provided which is mounted rigidly to die portion 43 and has a central pin 50 which engages rotor center hole 24. Die clamps 52 restrain die portion 41 and permit it to move axially relative to die portion 43 over a predetermined range of motion.

At the start of the operating sequence of machine 30, the upper and lower platens are separated and composite rotor 10, in the form shown in FIG. 1, is loaded onto die portion 41 such that pin 50 is inserted through rotor center hole 24. Once loaded, the side surface 44 of die portion 41 fits closely against the inside cylindrical surface of rotor center section wall 18. Thereafter, machine 30 is cycled such that the upper and lower platens are forced to move toward one another. At an intermediate stage of the cycle, face surfaces 36 and 42 of upper die 34 and lower die assembly portion 41 respectively compressively engage mounting surface 16. Once this occurs, compression of spring 46 enables the upper and lower platens to continue their motion toward one another. Such continued motion causes post 48 to be extended from face surface 42 of die portion 41, thus engaging the center of center section 12 and forming a "bubble" of metal which is generally designated by reference number 54.

Since rotor wall 18 is restrained through engagement with die side surface 44, the development of bubble 54 causes the material forming mounting surface 16 which is clamped between faces 36 and 42 to undergo strain in a radially inward direction. Such strain has been found to substantially reduce the waviness and flatness imperfections by causing center section 12 to closely conform with face surfaces 36 and 42.

Machine 60 shown in FIG. 4 illustrates an operation which is completed after the step performed by machine 30. Machine 60 similarly includes upper and lower platens (not shown) which are controllably moved toward one another preferably through the application of hydraulic pressure. Lower die assembly 66 defines face surface 67, central bore 68 and a plurality of radially spaced bores 70. Locator blocks 72 are provided to position rotor 10 with respect to lower die assembly 66. Springs pads 74 are provided to enable the rotor to float slightly until the platens are brought together.

Upper die assembly 62 is principally comprised of die portions 64 and 65. Die portion 65 floats relative to die portion 64 through suspension by die springs 78. The range of axial movement of die portion 65 is restrained using die clamps 80. Center post 82 and radially located posts 84 are rigidly connected to die portion 64 and extend into associated bores 81 and 83 in die portion 65. Die portion 65 further defines face surface 85. Posts 82 and 84 are oriented in registry with bores 68 and 70, respectively, of lower die 66.

Figure 5:
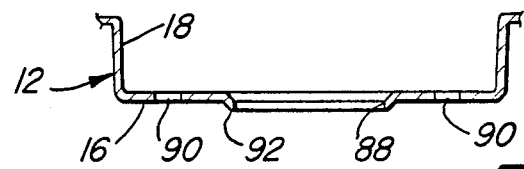
FIG. 5 is a partial cross-sectional view of a rotor showing the completion of the processing steps of FIG. 4.
Figure 6:
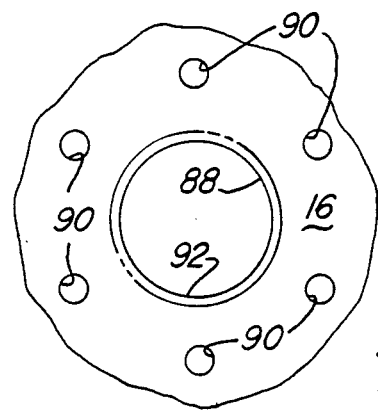
FIG. 6 is a frontal view of the rotor portion shown in FIG. 5.

In operation of machine 60, composite rotor 10 is loaded into position following the bubbling step performed by machine 30. When machine 60 is cycled, rotor center section 12 is first clamped by die surfaces 67 and 85, and continued motion of the upper and lower platens causes posts 82 and 84 to protrude from face surface 85 of upper die assembly 62 such that they blank out center hole 88 and mounting stud clearance holes 90. Preferably, a slight chamfering is provided around the periphery of die bore 68 to provide a slightly deflected flange 92 defining the inside edge of center hole 88, as best shown in FIG. 5. Center hole 88 provides clearance for the axle hub of the associated vehicle. Holes 90 are provided to enable wheel mounting studs to extend through rotor 10. Following the step of forming holes 88 and 90, rotor 10 is provided with additional machining processes for properly finishing the braking face surfaces 26 and 28 of rotor 10.

While the above description constitutes the preferred embodiments of the present invention, it will be appreciated that the invention is susceptible to modification, variation and change without departing from the proper scope and fair meaning of the accompanying claims.

What is claimed is:

1. A process for improving the flatness of the center section of a composite rotor, comprising the steps of:
    providing a stamped sheet metal center section with a braking face portion defined by cast or forged material,
    forming a dome-shaped bubble of deflected material within said center section after said braking face portion is formed on said center section while supporting said center section around said deflected material, thereby radially inwardly straining portions of said rotor center section and reducing waviness and imperfections in said center section, and
    removing said bubble from said center section thereby defining a center clearance hole.

2. A process for improving the flatness of the center section of a composite rotor according to claim 1 further comprising the step of forming a plurality of radially spaced holes surrounding said center clearance hole thereby defining clearance holes for wheel mounting studs.

3. A process for improving the flatness of the center section of a composite rotor according to claim 1 further comprising the step of clamping said center section in an area surrounding said dome-shaped bubble.

4. A process for improving the flatness of the center section of a composite rotor, comprising the steps of:
    providing a stamped metal center section having a circular mounting surface, a cylindrical side surface and a radially projecting flange, and providing a braking face portion formed by cast or forged metal interlocking with said flange,
    clamping said center section after said braking face portion is formed on said center section,
    supporting said side surface,
    forming a dome-shaped bubble of deflected metal within said mounting surface thereby radially inwardly straining portions of said mounting surface, and reducing waviness and imperfections in said mounting surface, and
    removing said bubble from said mounting surface thereby defining a center clearance hole.

5. A process for improving the flatness of the center section of a composite rotor according to claim 4 further comprising the step of forming a plurality of radially spaced holes surrounding said center clearance hole thereby defining clearance holes for wheel mounting studs.

6. A process for improving the flatness of the center section of a composite rotor according to claim 4 further comprising the step of clamping said center section in an area surrounding said dome-shaped bubble.

* * * * *